United States Patent [19]

Salpaka

[11] Patent Number: 5,573,255
[45] Date of Patent: Nov. 12, 1996

[54] QUICK RELEASE CHUCK DEVICE FOR SAW BLADES

[75] Inventor: Glenn L. Salpaka, Salem, S.C.

[73] Assignee: Power Tool Holders, Inc., Wilmington, Del.

[21] Appl. No.: 435,473

[22] Filed: May 5, 1995

[51] Int. Cl.⁶ .......................... B23B 31/107; B23B 31/22
[52] U.S. Cl. ................................ 279/75; 279/905; 30/392
[58] Field of Search .......................... 279/74, 75, 82, 279/904, 905; 30/337, 351, 392–394; 83/699.21

[56] References Cited

U.S. PATENT DOCUMENTS

| | | | |
|---|---|---|---|
| 1,984,500 | 12/1934 | Tautz | 30/392 |
| 2,443,050 | 6/1948 | Menking . | |
| 2,627,882 | 2/1953 | Kleinsmith | 83/699.21 |
| 2,736,562 | 2/1956 | Blackburn . | |
| 2,807,473 | 9/1957 | Kiehne . | |
| 3,204,470 | 9/1965 | Brucker | 30/392 |
| 3,367,727 | 2/1968 | Ward et al. . | |
| 3,436,086 | 4/1969 | Glenzer . | |
| 3,521,895 | 7/1970 | Smith . | |
| 3,555,678 | 1/1971 | Agulnick et al. . | |
| 3,750,283 | 8/1973 | Hoffman . | |
| 3,901,117 | 8/1975 | Hoffman | 30/392 |
| 3,947,047 | 3/1976 | Hultman . | |
| 4,041,729 | 8/1977 | Bilz . | |
| 4,106,181 | 8/1978 | Mattchen . | |
| 4,204,692 | 5/1980 | Hoffman . | |
| 4,351,112 | 9/1982 | Nalley . | |
| 4,599,019 | 7/1986 | Ueberall . | |
| 4,601,477 | 7/1986 | Barrett et al. . | |
| 4,692,073 | 9/1987 | Martindell . | |
| 4,900,202 | 2/1990 | Wienhold . | |
| 5,011,344 | 4/1991 | Johnson . | |
| 5,013,194 | 5/1991 | Wienhold . | |
| 5,103,565 | 4/1992 | Holzer, Jr. . | |
| 5,301,961 | 4/1994 | Wozar . | |
| 5,322,302 | 6/1994 | Quirijnen . | |
| 5,340,129 | 8/1994 | Wright . | |
| 5,398,946 | 3/1995 | Quiring . | |
| 5,443,276 | 8/1995 | Nasser et al. . | |
| 5,458,346 | 10/1995 | Briggs . | |

Primary Examiner—Steven C. Bishop
Attorney, Agent, or Firm—Dority & Manning

[57] ABSTRACT

A quick release chuck device for releasably holding a jaw blade includes a body member having an internal longitudinal bore defined therein. The longitudinal bore has a substantially rectangular cross-section shape for receipt of conventionally sized saw blades. At least one radial bore is defined in the body member and is in communication with the longitudinal bore through one of its short sides. An engaging device is disposed in the radial bore and is movable radially within the radially bore so that at least a portion of the engaging device extends into the longitudinal bore in a locking mode of the chuck device to hold a saw blade within the device through contact with a recess defined in the edge of the blade. A spring-biased outer sleeve is disposed about at least a portion of the body member. The outer sleeve is movable longitudinally between a released position and a locking position. The outer sleeve member includes an engaging surface having a portion which contacts the engaging member and forces the engaging member radially inward to engage a saw blade inserted into the longitudinal bore in the locking position of the sleeve member. The device is unlocked by an operator grasping the outer sleeve surface and moving the outer sleeve to its released position thereby allowing the engaging member to move radially outward to release the saw blade.

23 Claims, 4 Drawing Sheets

QUICK RELEASE CHUCK DEVICE FOR SAW BLADES

BACKGROUND OF THE INVENTION

The present invention relates to a quick release chuck device, and in particular to a chuck device configured for operation with a saw blade, such as a scroll saw or saber saw blade.

Various quick release chuck devices are known and utilized in the art for holding tools or tool bits having circular or hexagonal tool shanks. For example, U.S. Pat. No. 4,692,073 to Martindell describes a chuck apparatus for a power bit. The chuck apparatus includes a ball disposed in a bore which contacts a portion of the shank of the power bit which is inserted in the bore. The shank portion of the power bit is hexagonal and mates with a hexagonal shape defined in the bore which prevents relative rotation between the power bit and the chuck device. The spring loaded ball prevents axial movement between the power bit and the chuck device. Quick release chuck devices, as that disclosed in the '073 patent, are desirable in that they allow for easy and quick change-out of power bits or tools while ensuring reliable and safe operation of the tool.

Conventional power saws which hold saw blades for reciprocal motion, such as a saber saw or scroll saw, have conventionally relied on chuck devices incorporating set screws or other cumbersome and time consuming engaging devices to attach the saw blade to the driving member of the tool. Various attempts have been made in the art to design a quick release chuck device for saws without success. The prior designs proved to be either to complicated to mass produce on a commercial basis, or simply did not adequately hold the saw blade. For example, U.S. Pat. Nos. 3,750,283 and 4,204,692 to Hoffman are examples of such prior art devices. Accordingly, an uncomplicated and easy to produce quick release chuck device which affords quick and easy change-out of saw blades without degrading the reliability or safety of the tool would be an extremely beneficial and welcome advancement in the art.

OBJECTS AND SUMMARY OF THE INVENTION

It is therefore a principle object of the present invention to provide a quick release chuck apparatus or device which reliably holds a saw blade relative to a driving member for reciprocal sawing motion.

A further object of the present invention is to provide a quick release chuck device which permits easy and rapid change-out of saw blades without the necessity of utilizing other tools or key devices to release set screws or similar devices.

And still a further object of the present invention is to provide a quick release chuck device for saw blades which can be readily retro-fitted to existing power saws.

Another object of the present invention is to provide a power saw incorporating an efficient and reliable quick release chuck device for a saw blade.

And yet another object of the present invention is to provide a uniquely designed saw blade for use with the present novel chuck device.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the presently preferred quick release chuck device holds saw blades having rectangular shank portions and detente recesses defined in at least one of the side edges thereof. The chuck device according to the invention includes a body member. This body member has an internal longitudinal bore defined therein which is substantially rectangular in cross section. The longitudinal bore accordingly has short sides and long sides. The short sides are slightly wider than the thickness of conventional saw blades intended to be inserted into the device. At least one radial bore is defined in the body member. The radial bore is in communication with the longitudinal bore through one of the bore's shorter sides. An engaging device, such as a detente ball, is disposed in the radial bore. The engaging device is radially movable within the radial bore so that at least a portion of the engaging device extends into the longitudinal bore to contact an edge of the saw blade in a locking mode or position of the chuck device. An outer sleeve is disposed about at least a portion of the body member. This outer sleeve is spring biased and is movable longitudinally relative to the body member between a released position and a locking position. The outer sleeve member comprises an engaging surface having a sloping portion which contacts the engaging member thereby forcing the engaging member radially inward in the locking position. In this manner, the engaging member engages an edge of a saw blade inserted into the longitudinal bore. Preferably, the engaging member engages in a recess defined in the saw blade edge. The engaging surface is further configured to allow the engaging member to move radially outward in the released position of the outer sleeve member to release the saw blade from the chuck device. The chuck device further includes a spring member which is operably disposed relative to the outer sleeve member and the body member to bias the sleeve member to the locking position.

The chuck device also preferably includes a mating mechanism for mating the body member to a driving member of a power tool. For example, the mating mechanism may comprise a set screw and corresponding hole for mating the chuck device with a drive member. In an alternative preferred embodiment, the mating mechanism may comprise threads defined in the body member for threaded engagement of the body member with the driving member. In yet an alternative preferred embodiment, the body member may be formed integral with the driving member of a power tool.

In a preferred embodiment of the invention, the outer sleeve member is biased by the spring mechanism in a rearward direction. In this manner, the outer sleeve member is movable by an operator in a forward direction against the spring mechanism to the released position. The operator then releases the outer sleeve member which springs back to the locking position. In an alternative preferred embodiment, the outer sleeve member may be biased by the spring member in a forward direction. In this manner, the operator grasps the outer sleeve member and moves the sleeve in a rearward direction against the spring mechanism to the released position.

The radial bore is disposed so as to be in communication with one of the short sides of the longitudinal bore. In this manner, the engaging member thereby engages with an edge of a saw blade inserted into the longitudinal bore. This embodiment may preferably comprise two radially oppositely disposed radial bores and respective engaging members such that the engaging members engage with opposite side edges of the saw blade inserted into the longitudinal bore.

The chuck device also preferably includes a shoulder defined relative to the body member to limit longitudinal movement of the outer sleeve member in the biasing direction of the spring mechanism.

In a preferred embodiment of the chuck device, the engaging surface includes a sloping section which contacts the engaging mechanism in the locking position of the outer sleeve, and a non-sloping section which defines a recess area for the engaging mechanism in the released position of the outer sleeve.

The present invention also includes a power saw incorporating the novel chuck device as described above, and a saw blade designed for use with the chuck device.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
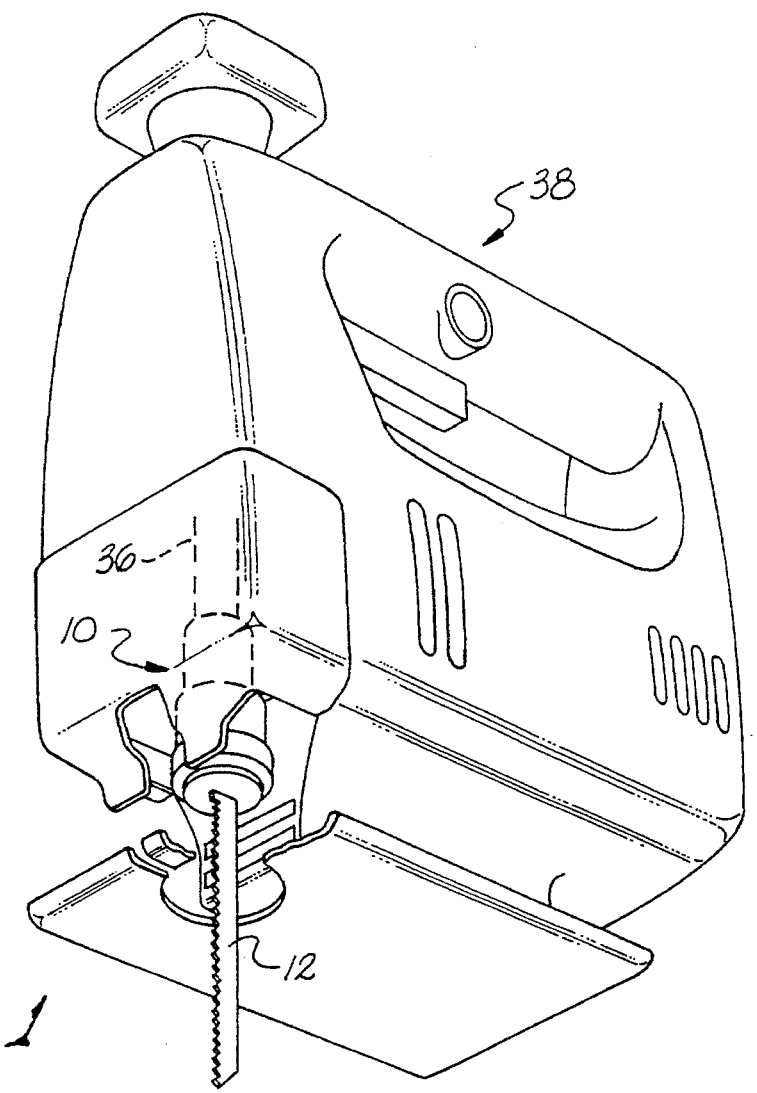
FIG. 1 is a perspective view of a quick release chuck device according to the invention incorporated with a conventional saber saw.

Reference will now be made in detail to the presently embodiments of the invention. One or more examples of which are illustrated in the accompanying drawings. Each example is provided by way of explanation of the invention, not limitation of the invention. In fact, it will be those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

Referring to FIG. 1 in general, a quick release chuck device 10 is illustrated in for releasably holding a saw blade 12 to a driving member 36 of a conventional saw or power tool 38. It should be understood that the chuck device 10 is illustrated as incorporated with a saber saw or scrolling saw for illustrative purposes only. The present invention is in no way limited to use with any particular type of power tool, but may be utilized in any application wherein it is desired to releasably attach a saw blade to a power tool.

Figure 2:
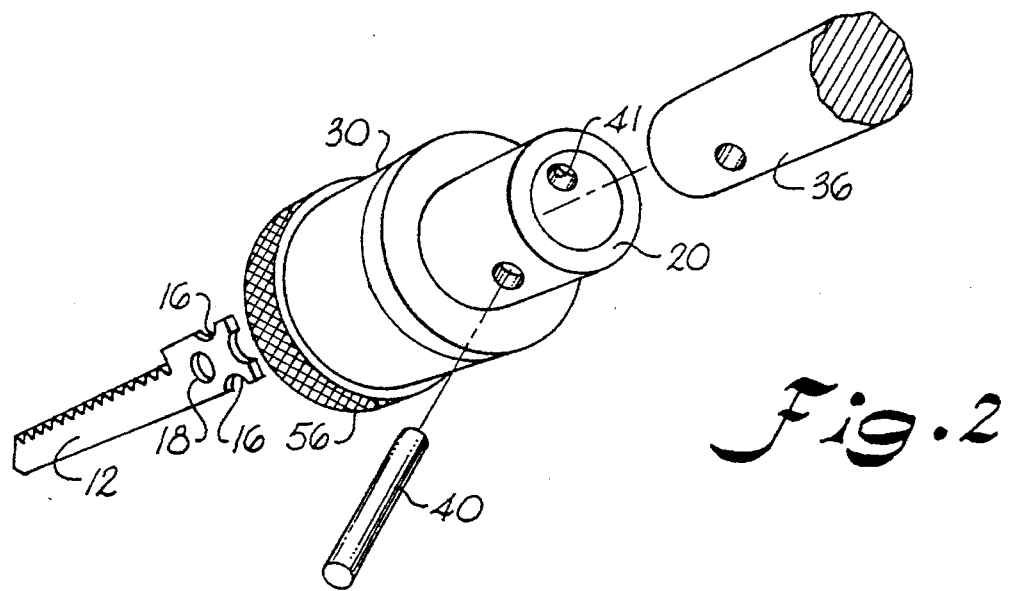
FIG. 2 is a perspective view of a quick release chuck device according to the invention.

Chuck device 10 is particularly suited for utilization with conventionally sized saw blades, as illustrated particularly in FIG. 2. Conventional saw blades generally include a hole 18 formed through the flat sides thereof and also a recess formed in the extreme end thereof for mating engagement by set screws or similar devices in conventional chuck devices. For use with the present chuck device 10, saw blades 12 also have at least one detente or recess 16 defined in at least one of the side edges thereof. Recesses 16 are easily formed in conventional saw blades and the additional hole 18 or end recess will in no way affect operation of device 10.

Chuck device 10 includes a body member 20. Body member 20 has an internal longitudinal bore 22 defined therein. As particularly seen in FIGS. 9 through 11, longitudinal bore 22 is substantially rectangular in cross-section and has short sides or narrow sides 24 and long sides or wide sides 26. Short sides 24 are slightly wider than the thickness of a conventional saw blade to be inserted into the longitudinal bore 22, as generally illustrated in the figures.

Body member 20 also includes at least one radial bore 28 defined therein. Radial bore 28 is essentially perpendicular to longitudinal bore 22 and is in communication with longitudinal bore 22 through one of the short sides 24 in that radial bore 28 opens into longitudinal bore 22 through the respective short side 24.

Figure 6:
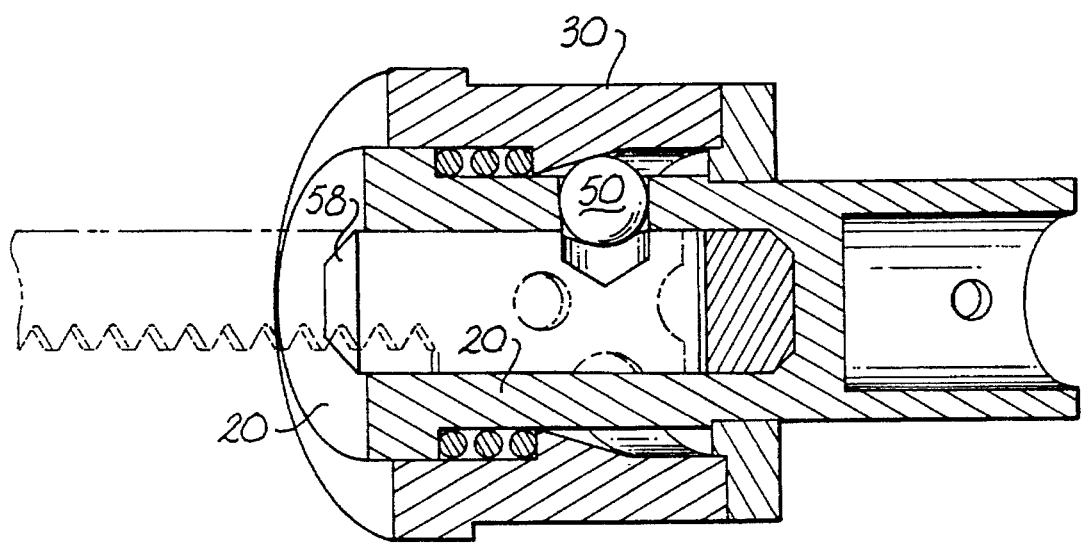
FIG. 6 is a side cut-away view of yet another alternative preferred embodiment of a chuck device.

In an alternative preferred embodiment of the invention illustrated particularly in FIG. 6, body member 20 includes a multi-sided insert member 58 fitted into a corresponding hole or bore defined in the body member. For example, insert member 58 may comprise a hex-shaped insert press fitted into a hex-shaped opening in the face of body member 20. This embodiment may be preferred for ease of manufacturing or machining longitudinal bore 22. It is far easier to machine or cut a rectangular slot at least partially through insert member 58 and then press fit or otherwise fit member 58 into a corresponding bore than to try to machine or cut bore 22 directly into body member 20. Additionally, hex-shaped blanks are readily available for this application.

Figure 3:
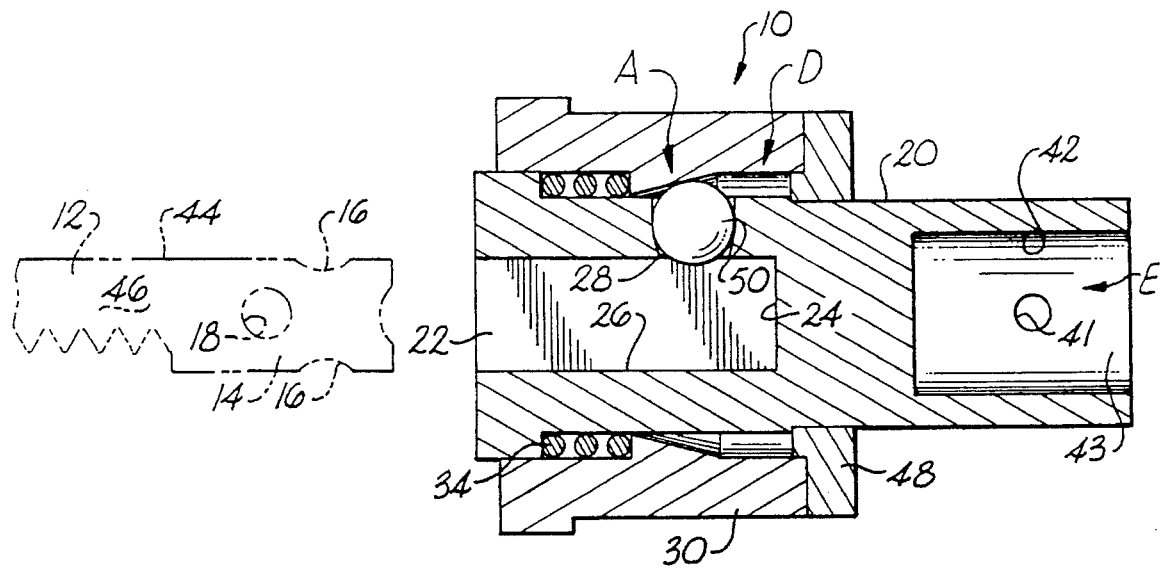
FIG. 3 is a cut-away side view of the quick release chuck illustrated in FIG. 2 shown in its locking position.
Figure 7:
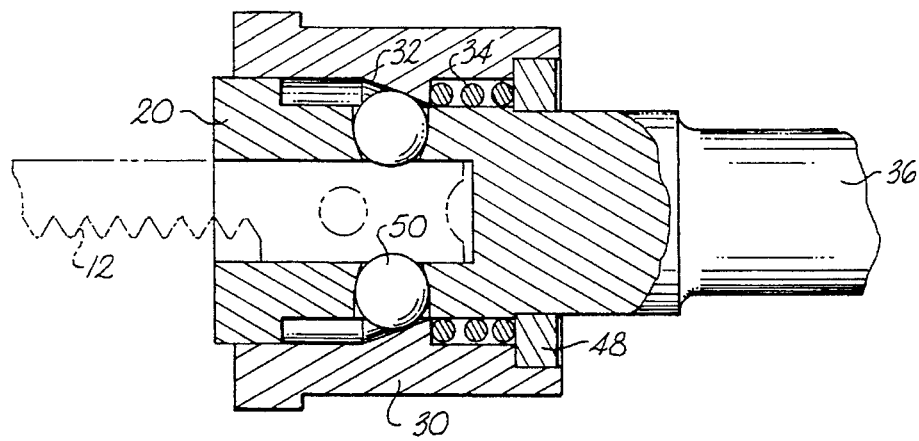
FIG. 7 is a cut-away side view of a chuck device according to the invention formed integral with a driving member of a power tool or saw.

An engaging device, generally A, is disposed in radial bore 28. Engaging device A is radially movable within radial bore 28 so that at least a portion of the engaging device extends into longitudinal bore 22 through one of the short sides of the bore in a locking mode or position of chuck device 10, as particularly illustrated in FIG. 3. Referring to FIG. 3, engaging device A comprises a detente ball 50 which is seated in radial bore 28. As can be seen in FIG. 3, a portion of ball 50 extends into longitudinal bore 22. Radial bore 28 is tapered or curved at the lip portion so as to retain ball 50 therein. In the preferred embodiment, engaging device A comprises detente balls 50. However, it should be understood, that engaging device A can comprise any mechanical device which is capable of moving radially within radial bore 28 so as to contact jaw blade 12 inserted into longitudinal bore 22 along the blade's edge 44. Engaging device A, particularly ball 50, is located relative to longitudinal bore 22 so as to fit into or engage recesses 16 formed along an edge of a conventional saw blade 12, as particularly illustrated in FIGS. 5 through 7. It should be understood that recesses 16 are readily formed or defined in conventional saw blades by partial drilling or grinding and that conventional saw blades do not otherwise limit use of the present chuck device 10. Alternatively, engaging device A may contact a flat planar surface on jaw blade 12.

Chuck device 10 also includes a spring biased outer sleeve member 30 which is disposed about a portion of the body member 20, as particularly illustrated in FIGS. 3 through 7. Outer sleeve member 30 is movable longitudinally relative to body member 20 between a released position and a locking position. The released position of the outer sleeve is illustrated particularly in FIG. 4. The locking position of the outer sleeve is illustrated particularly in FIG. 3. A spring mechanism or device 34 is operably disposed between body member 20 and outer sleeve 30 so as to bias the outer sleeve to its locking position, as particularly illustrated in FIG. 3. Outer sleeve 30 is longitudinally movable by an operator grasping the outer surface of sleeve 30 and pulling or pushing outer sleeve 30 against the biasing force of spring 34. In a preferred embodiment, outer sleeve 30 is biased longitudinally rearward with respect to the front end of chuck device 10 so that an operator must pull outer sleeve 30 forward to a released position to insert or release jaw blade 12, as particularly shown in FIG. 4. In an alternative embodiment particularly illustrated in FIG. 7, outer sleeve 30 is biased in a forward direction to its locking position. In this embodiment, outer sleeve 30 is moved to its released position by an operator grasping sleeve 30 and pulling or pushing the sleeve towards the power tool or drive member 36.

Device 10 preferably includes shoulder or similar retaining device 48 defined relative to body member 20 to longitudinally define or limit the longitudinal movement of sleeve 30 to its locking position. Shoulder 48 may be formed integral with body member 20, or may comprise a snap ring or retaining ring fixed to body member 20.

Outer sleeve member 30 includes an engaging surface, generally D, having a portion which contacts the engaging member and forces the engaging member radially inward in the locking position of sleeve 30 to engage saw blade 12 inserted into bore 22. In a preferred embodiment, the portion of engaging surface D contacting the engaging member comprises a sloped portion 32, as particularly illustrated in the figures. Accordingly, as sleeve 30 is biased in one direction by spring 34, sloped portion 32 forces ball 50 radially inward to contact jaw blade 12. Engaging surface D is also configured to allow engaging member or ball 50 to move radially outward in the released position of sleeve 30 thereby allowing the saw blade to be removed from the chuck device, as particularly illustrated in FIG. 4. In this embodiment, engaging surface D comprises a non-sloping or flat section 52. Section 52 defines a recess area 54 for detente ball 50 once sleeve 30 is moved to its released position.

Chuck device 10 also preferably includes a mating mechanism, generally E, for attaching body member 20 to a driving member 36 of a power tool 38. In one preferred embodiment, mating mechanism E may comprise a set screw 40 and corresponding set screw hole 41, as particularly illustrated in FIG. 2. In an alternative preferred embodiment, body 20 may be mated to drive member 36 through threaded engagement. In this embodiment, body member 20 may comprise threads 42 formed on the surface of a bore 43 defined in body member 20. It should be understood that any manner of conventional mating devices or mechanisms may be employed in this manner. Alternatively, body member 20 may be formed integral with drive member 36, as particularly illustrated in FIG. 7.

Figure 4:
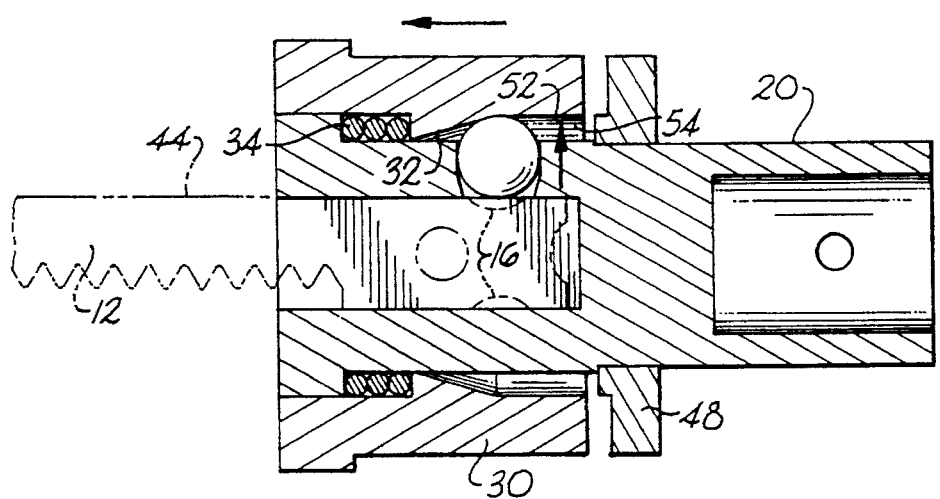
FIG. 4 is a cut-away side view of the chuck device illustrated in FIG. 3 shown in its released position wherein a saw blade can be inserted or removed from the device.
Figures 8, 9, 10:
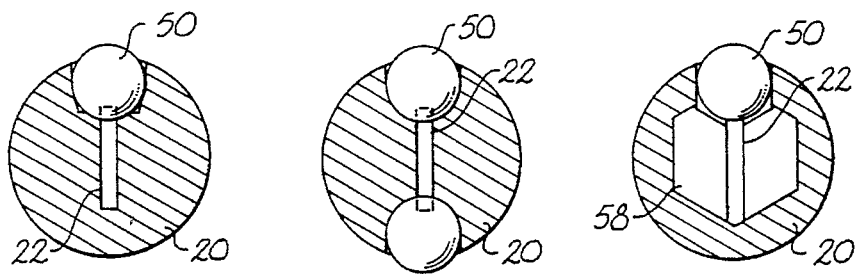
FIG. 8 is a cut-away end view of the chuck device shown in FIGS. 3 and 4.
FIG. 9 is a cut-away end view of the chuck device illustrated in FIG. 5.
FIG. 10 is a cut-away end view of the chuck device illustrated in FIG. 6.

One preferred embodiment of chuck device 10 is illustrated in FIGS. 3 and 4. In this embodiment, only one engaging mechanism or detente ball 50 is provided to engage in either of the recesses 16 defined in saw blade 12. This embodiment is also illustrated in FIG. 8. In this embodiment, detente ball 50 is in communication with one of the short sides 24 of longitudinal groove 22, as can be particularly seen in FIG. 8.

Figure 5:
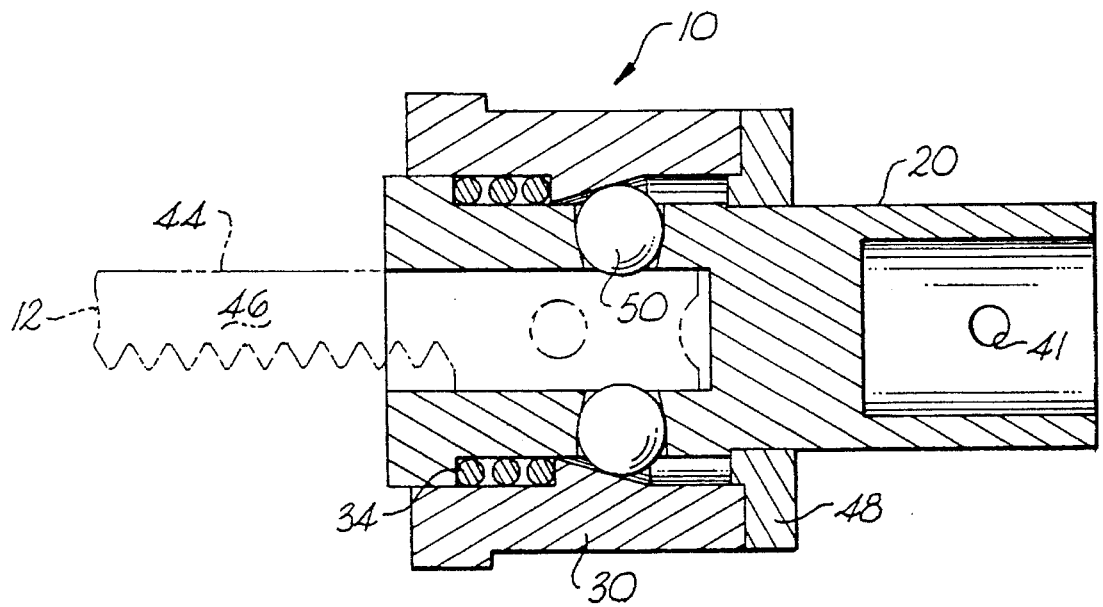
FIG. 5 is a cut-away side view of an alternative embodiment of a quick release chuck device according to the invention.

An alternative embodiment of device 10 is illustrated particularly in FIGS. 5 and 9. In this embodiment, radially opposite detente balls 50 are provided so as to be in communication with both short sides 24 of longitudinal groove 22. In this manner, balls 50 engage in recesses 16 defined on the edges 44 of saw blade 12.

An alternative preferred embodiment of the invention is illustrated in FIGS. 6 and 10. In this embodiment, radial bore 28 is in communication with longitudinal bore 22 through insert member 58, as particularly seen in FIG. 10. In this embodiment, engaging device A or balls 50 engage or contact recess 16 defined in an edge 44 of saw blade 12. It should be understood that radially opposite balls and respective radial bores 28 may also be provided in the embodiment illustrated in FIGS. 6 and 10.

The present invention also includes any manner of power tool 38 incorporating the novel chuck device 10 and saw blade 12 described herein.

The present invention also includes any manner of saw blade designed for utilization with the quick release chuck device described above. Saw blade 12 according to the invention includes flat longitudinal edges 44 and faces 46. At least one detente or recess 16 is defined along one of the edges 44. Preferably a recess 16 is defined in each of the edges 44, as particularly seen in FIGS. 3 through 6. Recess 16 is depicted as radiused in the figures, but it should be understood that recess 16 may comprise any manner or configuration of notch, groove, or the like. As discussed above, conventional saber saw or jig saw blades may be modified by machining or otherwise forming recesses 16 along edges 44. Thus, only one additional manufacturing or machining step need be implemented to convert conventionally designed blades to the present inventive blades for use with chuck device 10 described herein.

It will be apparent to those skilled in the art that various modifications and variations can be made in the apparatus of the present invention without departing from the scope or spirit of the invention. For example, the invention can be configured with any manner of power tool for releasably holding a saw blade. Also, various embodiments of the engaging device as described herein may be incorporated in various embodiments of the invention. Thus, it is intended that the present invention cover such modifications and variations of the invention provided they come within the scope of the appended claims and their equivalents.

What it is claimed is:

1. A quick release chuck device for holding saw blades having flat rectangular shank portions, said chuck device comprising:

a body member, said body member having an internal longitudinal bore defined therein, said longitudinal bore being substantially rectangular in cross section and having short sides and long sides so as to accept a conventional saw blade to be inserted into said bore;

at least one radial bore defined in said body member, said radial bore defined substantially radially opposite one of said longitudinal bore short sides and being in communication with said longitudinal bore through said short side;

an engaging device disposed in said radial bore, said engaging device being radially movable within said radial bore so that at least a portion of said engaging device extends radially into said longitudinal bore in a locking mode of said chuck device;

a spring biased outer sleeve member disposed about at least a portion of said body member, said outer sleeve member movable longitudinally relative to said body member between a released position and a locking position, said outer sleeve member comprising an engaging surface having a portion contacting said engaging member and forcing said engaging member radially inward in said locking position to engage with a recess defined in an edge of a saw blade inserted into said longitudinal bore, said engaging surface allowing said engaging member to move radially outward in said released position to release a saw blade from said chuck device; and a spring member operably disposed relative to said outer sleeve member and said body member to bias said sleeve member to said locking position.

2. The chuck device as in claim 1, further comprising a mating mechanism for mating said body member to a driving member of a power tool.

3. The chuck device as in claim 2, wherein said mating mechanism comprises a set screw.

4. The chuck device as in claim 2, wherein said mating mechanism comprises threads defined in said body member for threaded engagement of said body member with a driving member.

5. The chuck device as in claim 1, wherein said body member is formed integral with a driving member of a power tool.

6. The chuck device as in claim 1, wherein said outer sleeve member is biased by said spring mechanism in a rearward direction, said outer sleeve member being movable in a forward direction against said spring mechanism to said released position.

7. The chuck device as in claim 1, wherein said outer sleeve member is biased by said spring mechanism in a forward direction, said outer sleeve member being movable in rearward direction against said spring mechanism to said released position.

8. The chuck device as in claim 1, further comprising two radially oppositely disposed said radial bores and engaging members such that said engaging members engage with opposite edges of a saw blade inserted into said longitudinal bore.

9. The chuck device as in claim 1, further comprising a shoulder defined relative said body member to limit longitudinal movement of said outer sleeve member in the biasing direction of said spring mechanism.

10. The chuck device as in claim 1, wherein said engaging member comprises a detente ball.

11. The chuck device as in claim 10, wherein said engaging surface further comprises a sloping section contacting said engaging mechanism in said locking position and a non-sloping section which defines a recess area for said detente ball in said released position of said outer sleeve.

12. The chuck device as in claim 1, wherein said body member further comprises a multi-sided insert member fitted into a corresponding bore defined in said body member, said internal longitudinal bore defined in said insert member.

13. The chuck device as in claim 12, wherein said insert member is press fitted into said body member.

14. A quick release chuck device for holding saw blades having flat rectangular shank portions and detente recesses or holes defined therein, said chuck device comprising:

a body member, said body member having an internal rectangular cross section longitudinal bore defined therein to accommodate a rectangular shank portion of a saw blade inserted therein;

at least one radial bore defined in said body member, said radial bore in communication with a short side of said longitudinal bore and defined in said body member radially opposite said longitudinal bore short side;

a spring biased outer sleeve disposed about at least a portion of said body member, said outer sleeve longitudinally movable relative to said body member; and a detente ball disposed in said radial bore and in contact with said outer sleeve, said detente ball radially movable within said radial bore so that at least a portion of said detente ball extends substantially only radially into said longitudinal bore in a first spring biased longitudinal position of said outer sleeve to engage a recess defined in an edge of a saw blade to lock the saw blade within said longitudinal bore, said detente ball movable radially outward in a second longitudinal position of said outer sleeve opposite said first longitudinal position to release a saw blade within said longitudinal bore;

a spring biased outer sleeve member disposed about at least a portion of said body member, said outer sleeve member movable longitudinally relative to said body member between a released position and a locking position, said outer sleeve member comprising an engaging surface having a sloping portion contacting said engaging member and forcing said engaging member radially inward in said locking position to engage a saw blade inserted into said longitudinal bore, said engaging surface allowing said engaging member to move radially outward in said released mode to release a saw blade from said chuck device; and a spring member operably disposed relative to said outer sleeve member and said body member to bias said sleeve member to said locking position.

15. The chuck device as in claim 14, wherein said outer sleeve is spring biased in a rearward direction, said detente ball movable radially outward upon an operator grasping said outer sleeve and moving said outer sleeve forward.

16. The chuck device as in claim 14, further comprising an additional radial bore and detente ball disposed radially opposite said first radial bore and detente ball, said detente balls thereby engaging opposite edges of a saw blade inserted within said longitudinal bore.

17. The chuck device as in claim 14, further comprising a spring disposed between shoulders defined in said body member and said outer sleeve.

18. The chuck device as in claim 14, wherein said body member further comprises an attaching mechanism for mating said body member to a drive member of a power tool.

19. A power saw, comprising:

a drive member;

a quick release chuck device configured at the end of said drive member for holding saw blades having flat rectangular shank portions;

a saw blade inserted into said quick release chuck device, said saw blade having a rectangular shank portion with wide faces and thin edges, said saw blade having at least one recess defined in at least one said edge;

said chuck device further comprising a body member, said body member having an internal longitudinal bore defined therein, said longitudinal bore being substantially rectangular in cross section and having short sides and long sides;

at least one radial bore defined in said body member, said radial bore being in communication with said longitudinal bore through one of said short sides and defined in said body member radially opposite said longitudinal bore short side;

an engaging device disposed in said radial bore, said engaging device being radially movable within said radial bore so that at least a portion of said engaging device extends substantially radially into said longitudinal bore in a locking mode of said chuck device;

a spring biased outer sleeve member disposed about at least a portion of said body member, said outer sleeve member movable longitudinally relative to said body member between a released position and a locking position, said outer sleeve member comprising an engaging surface having a portion contacting said engaging member and forcing said engaging member radially inward in said locking position to engage with said recess defined in said saw blade edge, said engaging surface allowing said engaging member to move radially outward in said released position to release said saw blade from said chuck device; and a spring member operably disposed relative to said outer sleeve member and said body member to bias said sleeve member to said locking position.

20. The power saw as in claim 19, wherein chuck device further includes a multi-sided insert member fitted into said body member, said longitudinal bore defined in said insert member.

21. The power saw as in claim 19, wherein said chuck device is removably attached to said drive member.

22. The power saw as in claim 19, wherein said chuck device is formed integral with said drive member.

23. The power saw as in claim 19, wherein said chuck device further comprises two radially oppositely disposed said radial bores and engaging members such that said engaging members engage with opposite edges of said saw blade inserted into said longitudinal bore.

* * * * *